US007223045B2

(12) United States Patent
Migli

(10) Patent No.: US 7,223,045 B2
(45) Date of Patent: May 29, 2007

(54) DEVICE AND METHOD FOR DETACHABLY CONNECTING ABUTTING STRUCTURAL PARTS AND TIE MEMBER FOR USE TO FORM SAID DEVICE

(75) Inventor: Carlo Migli, Lecco (IT)

(73) Assignee: Agostino Ferrari S.p.A., Bergamo (IT)

( * ) Notice: Subject to any disclaimer, the term of this patent is extended or adjusted under 35 U.S.C. 154(b) by 133 days.

(21) Appl. No.: 10/490,941

(22) PCT Filed: Sep. 25, 2002

(86) PCT No.: PCT/EP02/11138

§ 371 (c)(1),
(2), (4) Date: Oct. 7, 2004

(87) PCT Pub. No.: WO03/027510

PCT Pub. Date: Apr. 3, 2003

(65) Prior Publication Data

US 2005/0042027 A1 Feb. 24, 2005

(30) Foreign Application Priority Data

Sep. 26, 2001 (IT) .................. MI20010525 U
Dec. 5, 2001 (IT) .................. MI20010636 U

(51) Int. Cl.
*F16B 12/10* (2006.01)
(52) U.S. Cl. ............... 403/409.1; 403/231; 29/452; 29/525.01; 411/15; 411/80.1
(58) Field of Classification Search ........... 403/231, 403/245, 407.1, 315, 316, 376, 380, 397, 403/DIG. 8, DIG. 13, DIG. 14, 406.1, 405.1, 403/292, 371, DIG. 12, 345, 350; 29/446, 29/452, 522.1, 525.01; 411/15, 24, 80, 510
See application file for complete search history.

(56) References Cited

U.S. PATENT DOCUMENTS 2,815,997 A * 12/1957 Korb ............... 52/584.1

(Continued)

*Primary Examiner*—Daniel P. Stodola
*Assistant Examiner*—Nahid Amiri
(74) *Attorney, Agent, or Firm*—Sughrue Mion, PLLC

(57) ABSTRACT

A device (1) for detachably connecting two abutting structural parts (2, 3) comprises a tie member (4), adapted to be at least partially inserted in a recess (5) formed in a first (2) of the structural parts (2, 3), and a locking element (6) operable to be disposed in a second (3) of the structural parts (2, 3) and to cooperate with an engagement surface (14, 45) of a rod member (10), slidably housed in a body (8) of the tie member (4), to pull the same towards the second structural part (3). The body (8) is provided with a first, expandable, portion (9) adapted to frictionally engage the recess (5) and with an engaging zone (13) cooperating with an expander region (12) of the rod member (10) operable to expand the first, expandable, portion (9) of the body (8) upon displacement of the rod member (10) relative to the same. The rod member (10) is provided with a traction portion (15) radially outwardly extending therefrom and adapted to cooperate with abutment means (16) radially formed in the body (8) of the tie member (4) at a predetermined axial distance from the engaging zone (13) to effect a substantially simultaneous displacement towards the second structural part (3) of the first, expandable, portion (9) of the body (8) of the tie member (4) and of the first structural part (2) in frictional engagement therewith.

54 Claims, 6 Drawing Sheets

U.S. PATENT DOCUMENTS

| | | | |
|---|---|---|---|
| 3,730,568 A | * | 5/1973 | Giovannetti ................. 403/245 |
| 4,131,376 A | * | 12/1978 | Busse ........................... 403/12 |
| 4,886,326 A | * | 12/1989 | Kuzyk ...................... 312/257.1 |
| 5,375,923 A | * | 12/1994 | Hall et al. ................ 312/348.4 |
| 5,403,109 A | * | 4/1995 | Johnson et al. ............. 403/231 |
| 5,536,078 A | * | 7/1996 | Novikoff .................... 312/195 |
| 5,567,081 A | | 10/1996 | Vallance |
| 5,590,975 A | * | 1/1997 | Horntvedt ................... 403/320 |
| 5,772,353 A | | 6/1998 | Vallance et al. |
| 5,810,505 A | * | 9/1998 | Henriott et al. ............. 403/230 |
| 5,823,700 A | * | 10/1998 | Poworoznek ............... 403/245 |
| 6,276,867 B1 | * | 8/2001 | Vallance ................. 403/409.1 |
| 6,276,868 B1 | | 8/2001 | Vallance |

\* cited by examiner

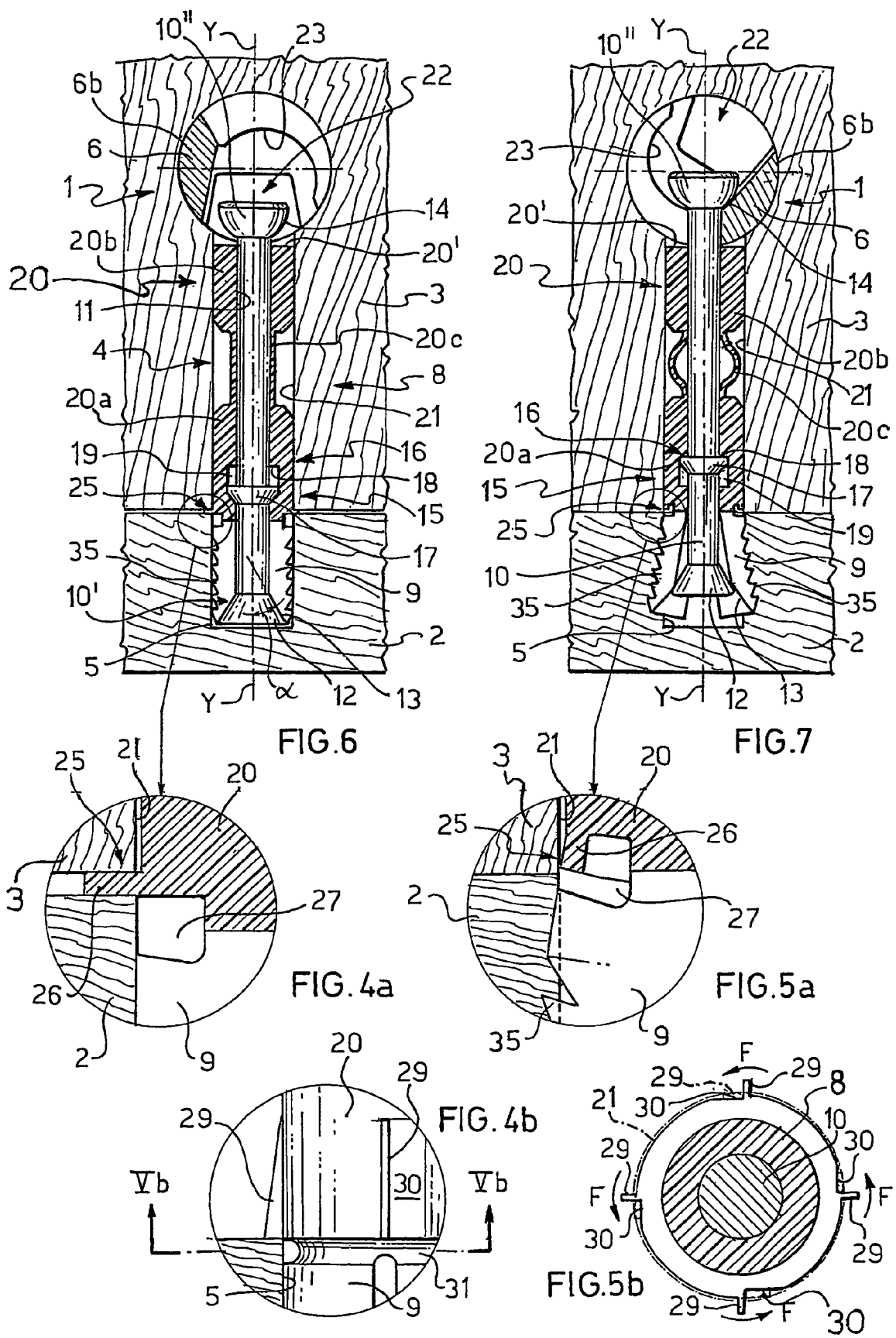

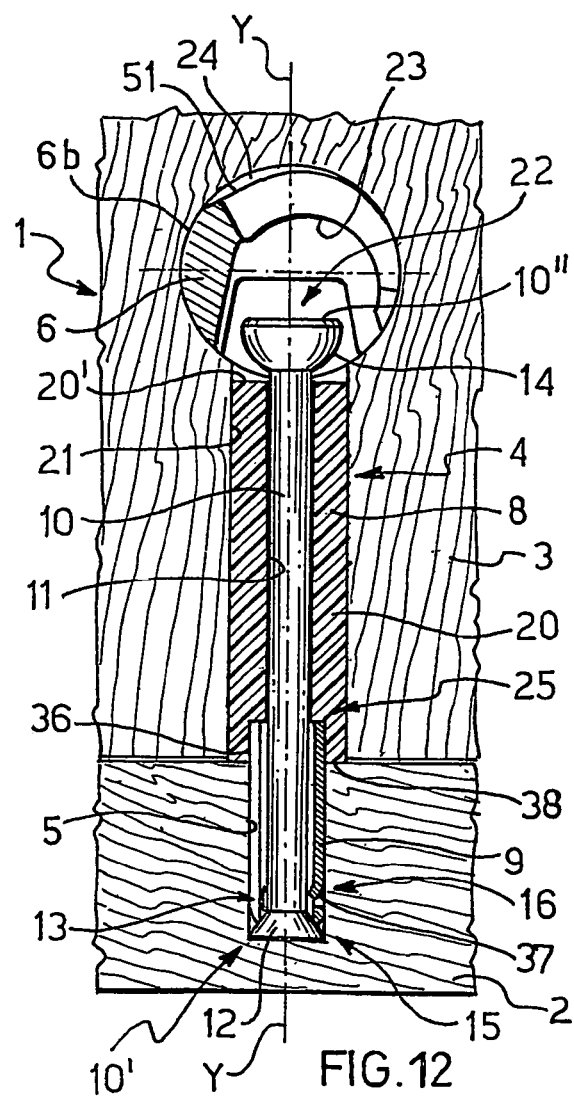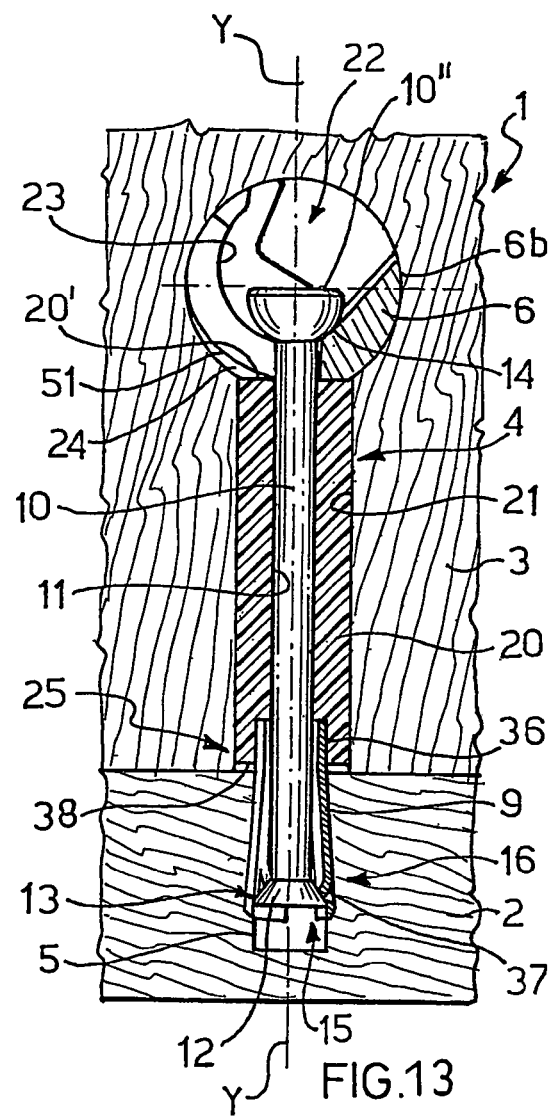

DEVICE AND METHOD FOR DETACHABLY CONNECTING ABUTTING STRUCTURAL PARTS AND TIE MEMBER FOR USE TO FORM SAID DEVICE

This is a National Stage entry of Application No. PCT/EP02/11138 filed Mar. 26, 2004; the disclosure of which is incorporated herein by reference.

BACKGROUND OF THE INVENTION

The present invention generally relates to a connecting device and method for detachably connecting two abutting structural parts.

More particularly, the present invention relates to a connecting device and method for detachably connecting flat structural parts, such as panels and the like, used to manufacture pieces of furniture, as well as to a tie member for use in forming such a device and to mounting kits for knock-down furniture parts comprising said connecting device and tie member.

PRIOR ART

In various fields of technology and particularly in the field of furniture assembly, the need often arises of detachably connecting together abutting structural parts such as for example flat furniture parts, such as panels and the like, which are perpendicular to one another (for example the side walls, bottom, top and rear wall of a locker).

To this end, use is largely made of devices which permit a quick, detachable connection of the furniture parts for both assembling and disassembling the same when necessary.

A first kind of known connecting devices for detachably connecting two abutting furniture parts comprises a locking drum which is rotatably introduced into the first furniture part and a tie member constituted by a screw-threaded pin member which is inserted by screwing into a bore hole formed in the second furniture part which is to be detachably connected to the former and which cooperates with a first eccentric surface on the locking drum for connecting together the furniture parts.

Although these connecting devices allow to achieve a traction action adapted to firmly maintain the two furniture parts in abutting relationship even when the assembled piece of furniture is transported or undergoes vibration, the required screwing of the pin members into the respective furniture part involves a considerable time and labor for the assembler which are nowadays hardly accepted by the market.

A second kind of known connecting devices for detachably connecting two abutting furniture parts is described, for example, in U.S. Pat. No. 4,131,376 and European Patent EP 0 736 143, and comprises a locking drum which is rotatably introduced into the first furniture part and a tie member, adapted to be at least partially inserted in a recess formed in the second furniture part, which tie member comprises in turn a body provided with an expandable end portion and a rod member slidably arranged in a through passage defined within the body of the tie member for axial displacement therein.

The rod member comprises a first end portion provided with an expander region operable to expand said first, expandable, portion of the body upon displacement of the rod member relative to the body of the tie member, and a second end portion defining an engagement surface which cooperates with a corresponding camming surface defined in the locking drum for connecting together the furniture parts.

In this case, the required connection between the furniture parts is ensured by the expansion of the expandable portion of the body of the tie member which is caused by the expander region of the rod member upon displacement of the same towards the locking drum.

Although these known connecting devices allow to substantially reduce the time and labor involved in the assembling operation of the furniture parts, experience has shown they are not always capable to firmly maintain the two furniture parts in abutting relationship when the assembled piece of furniture is transported or undergoes vibration. In some instances, this may allow a movement of the furniture parts relative to one another which may result, especially during transport, in damage occurring to the assembled piece of furniture.

SUMMARY OF THE INVENTION

The technical problem underlying the present invention is that of providing a connecting device for detachably connecting two abutting structural parts and in particular of flat furniture parts, such as panels and the like, which allows on the one hand to carry out the assembling operation of the furniture parts with a reduced time and labor and, on the other hand, to firmly maintain the two furniture parts in abutting relationship even when the assembled piece of furniture is transported or undergoes vibration.

According to the present invention, this technical problem is solved by a device for detachably connecting two abutting structural parts, comprising:

a) a tie member adapted to be at least partially inserted in a recess formed in a first of said structural parts, said tie member including:
 a1) a body provided with a first, expandable, portion adapted to frictionally engage said recess, and
 a2) a rod member slidably arranged in a through passage defined within the body of the tie member for axial displacement therein, said rod member having:
  a first end portion provided with an expander region operable to expand said first, expandable, portion of the body by cooperating with a corresponding engaging zone thereof upon displacement of the rod member relative to the body of the tie member, and
  a second end portion defining an engagement surface;
(b) a locking element operable to be disposed in a second of said structural parts and to cooperate with the engagement surface of said rod member to pull said rod member towards said second structural part, characterized in that said rod member is provided with a traction portion outwardly extending therefrom and adapted to cooperate with abutment means formed within the body of the tie member to effect a substantially simultaneous displacement towards said second structural part of said first, expandable, portion of the body of the tie member and of the first structural part in frictional engagement therewith, said abutment means being defined within said through passage at a predetermined axial distance from said engaging zone of the first, expandable, portion of said body.

Thanks to the aforementioned combination of features and as will be more clearly apparent in the following, the connecting device of the invention allows to simultaneously achieve the desired easy, quick and firm connection between the structural parts to be assembled with one another.

The expandable portion of the tie member, in fact, may be easily and quickly inserted in the first structural part to be connected, while the subsequent pulling action exerted by the locking element on the rod member allows to pull said first structural part towards the second one while ensuring that the two parts are firmly maintained in abutting relationship with one another on account of the specific structure of the tie member.

According to the invention, in fact, it has been observed that thanks to the provision within the body of the tie member of abutment means axially spaced from the engaging zone of the first, expandable, portion of the body the rod member, it is advantageously possible:

i) to expand in a dowel fashion and in a substantially radial direction the expandable portion of the tie member, so as to frictionally engage the recess formed in the first structural part, thanks to the cooperation between the expander region of the rod member and the corresponding engaging zone of first, expandable, portion of the body of the tie member; and then ii) to effect a substantially simultaneous axial displacement towards the second structural part of the first, expandable, portion of the body of the tie member, once expanded by the expander region of the rod member, and of the first structural part in frictional engagement with such expanded portion, thanks to the cooperation between the traction portion of the rod member and the abutment means formed in the body of the tie member.

Although the Applicant does not wish to be bound by any theory, it is believed that such an axial displacement of the rod member and of the expanded portion of the body of the tie member, coupled with the partial elastic nature of the latter and of the material which constitutes the furniture parts (usually consisting of wood or chipboards), causes a sort of "pre-load" of the tie member within the recess formed in the first structural part, with a partial compression of both materials (body of the tie member and furniture part) and also with a possible partial penetration of the expandable portion of the body of the tie member in the material constituting the first structural part if the hardness of the latter so allows.

Accordingly, it is also believed that the aforementioned axial "pre-load" conditions of the tie member, which ensures that the connected structural parts are firmly maintained in abutting relationship with one another, also accounts for the observed enhanced traction action exerted by the connecting device of the invention with respect to the devices of the cited prior art, in which the expandable portion is exclusively or mainly subjected to a substantially radial expansion, with a totally absent or, at best, with a negligible axial displacement in the expanded condition.

According to experimental tests carried out by the Applicant, the connecting device of the invention is capable to ensure a traction force on two abutting structural parts, such as two furniture panels, which is from 15% to 25%, or even more, higher than the traction force achievable with the connecting devices of the cited prior art provided with a dowel-shaped expandable portion which is solely or almost solely subjected to a substantially radial expansion for effecting the connection of the two structural parts.

In a preferred embodiment of the invention, the body of the tie member comprises a second portion adapted to be at least partially inserted in a bore hole formed in the second structural part.

Preferably, the first and second portions of the body of the tie member are integral with one another and are more preferably made of a suitable plastics material such as for example polyamide, polyethylene or polypropylene.

In this way, the body of tie member of the invention may be manufactured at low cost using well known molding techniques and possesses desired elastic properties which allow the same to be partially compressed by the rod member during the connection operation as discussed hereinabove.

For the purposes of the invention, the rod member and the locking element could be manufactured by die casting in a suitable metal material such as zinc or aluminum based die casting alloy, or may be manufactured using carbon steel or any other suitable metal alloy having the desired strength and processability characteristics.

It will be understood, however, that the above-described examples of materials and manufacturing methods of the tie member components are not to be taken as limiting.

For example, particularly for heavy duty purposes, the body of the tie member may be made of die cast zinc. In the case of the rod member, furthermore, it will be understood that for some applications the rod member may also advantageously be formed of a plastics material.

In a particularly preferred embodiment of the invention, the body of the tie member comprises an abutment means outwardly extending from the body of the tie member between the first and second portions thereof for limiting axial insertion of the first, expandable, portion into the recess formed in the first structural part.

In this way, the tie member may be correctly associated to the first structural part avoiding the risk that the first, expandable, portion is inserted too deeply into the recess formed in the first structural part.

Within the framework of this embodiment, it is also preferred that the aforementioned abutment means are substantially pliable.

Thanks to this feature, the abutment means advantageously allows to correctly position the first, expandable, portion of the body of the tie member in the recess formed in the first structural part in the initial stage of the connecting operations, but at the same time does not subsequently exert any undesired spacing action once the tie member is axially pulled by the locking means during the subsequent stages of the connecting operations. The pliable nature of the abutment means, in fact, allows the same to be deformed so as to assume a configuration which is substantially flush with the outer surface of the body of the tie member.

In order to further enhance the capability of the pliable abutment means of assuming such a substantially flush configuration, the body of the tie member according to the invention may further comprise at least one recess for housing the pliable abutment means when the tie member is completely or partly pulled towards said second structural part by the rod member operated by the locking element during a second part of the overall axial displacement of the rod member which takes place during the connecting operations.

Thus, in this particularly preferred embodiment of the invention such a recess advantageously allows to further reduce the risk that a gap may be formed between the two structural parts once the same are pulled in abutting relationship by the connecting device.

Preferably, the recess which houses the abutment means has a shape mating the shape of the latter so as to best accommodate the abutment means in the desired substantially flush configuration.

In a first preferred variant, the abutment means comprises a preferably pliable radial annular flange outwardly extending from the body of the tie member proximate to said first, expandable, portion thereof.

In this preferred variant, the body of the tie member of the invention comprises a recess which is constituted by an annular cavity which is defined in the body of the tie member between its first and second portions and which is adapted to house the pliable annular flange once the same is bent towards the first, expandable, portion of the body as a consequence of the pulling action exerted by the locking drum acting on the rod member.

In other words, the pliable annular flange is bent in a direction opposite to the direction of pulling and is housed in the annular cavity in a substantially complete manner ensuring that no gaps whatsoever may be formed between the two structural parts once the connecting operations have been completed.

In a second preferred variant which may advantageously allow to reduce, when necessary, the axial pulling force necessary to bend the abutment means in the desired substantially flush configuration, these means may comprise a plurality of preferably pliable circumferentially spaced radial protrusions outwardly extending from the second portion of the body of the tie member at a free end thereof proximal to the first, expandable, portion.

Also in this case, the body of the tie member of the invention may advantageously comprise an annular cavity which is defined in the body of the tie member between its first and second portions and which is adapted to house the pliable radial protrusions once the same are bent towards the first, expandable, portion of the body as a consequence of the pulling action exerted by the locking drum acting on the rod member.

In a third preferred variant, the abutment means comprises a plurality of preferably pliable circumferentially spaced longitudinal ribs outwardly extending from the second portion of the body of the tie member at a free end thereof proximal to the first, expandable, portion.

Preferably, the pliable longitudinal ribs taper to a point at their end distal from the first, expandable, portion of the body of the tie member and preferably have a substantially triangular shape.

In this preferred embodiment, the longitudinal ribs exert not only the function of abutment means capable of limiting axial insertion of the first, expandable, portion of the tie member into the recess formed in the first structural part, but also the additional advantageous function of ensuring a frictional engagement of the second portion of the body of the tie member in the bore hole formed in the second structural part.

The frictional engagement between the ribs and the bore hole formed in the second structural part may also involve a partial compression of the material constituting the ribs and/or a partial penetration of the same into the second furniture part depending upon the relative hardness of the materials constituting these engaging parts.

In this way, the longitudinal ribs advantageously allow to enhance the ability of the device of ensuring a firm abutting connection between the two furniture parts even when the assembled piece of furniture is transported or undergoes vibration.

In this preferred variant, the body of the tie member of the invention may comprise a plurality of recesses laterally formed aside each longitudinal rib in the outer surface of the second portion of the body.

Preferably, furthermore, these recesses have a shape substantially mating the shape of the longitudinal ribs.

Advantageously, these mating recesses are capable to house the pliable longitudinal ribs once the same are laterally bent along a circumferential direction as a consequence of the pulling action exerted by the locking drum acting on the rod member.

In this case, the pliable longitudinal ribs may be housed in the mating recesses in a more or less complete manner so as to adjust in the desired way the frictional engagement between the longitudinal ribs and the bore hole formed in the second furniture part and to ensure at the same time that no gaps whatsoever may be formed between the two structural parts once the connecting operations have been completed.

In a fourth preferred variant, the abutment means comprises an annular shoulder defined at said free end of the second portion of said body proximal to said first, expandable, portion.

Preferably, this annular shoulder is provided in the device when the cross-section of the first, expandable, portion of the body of the tie member is lower than the cross-section of the second portion of said body.

In a preferred embodiment thereof and as will be more clearly apparent in the following, the connecting device of the invention comprises stop means adapted to temporarily prevent any substantial axial displacement of the body of the tie member during the connecting operations, so as to allow a relative movement of the rod member with respect to said body and a consequent expansion in a substantially radial direction of the expandable portion of the tie member operated by the expander region of the rod member.

Conveniently, this relative movement takes place during a first part of the overall axial displacement which the rod member undergoes during the connecting operations.

In a first preferred variant of the invention, in which the second portion of the body of the tie member has a length substantially equal to the length of the bore hole formed in the second structural part, this stop means comprises a side surface of the locking element which cooperates in abutting relationship with a free end of such a second portion to temporarily prevent any axial displacement of the same until the expander region of the rod element has radially expanded in a substantially complete way the expandable portion of the tie member.

In this case and in order to ensure that the desired subsequent axial displacement of the expanded portion of the body may take place, the locking element is preferably provided with a recess adapted to house the free end of the second portion of the body while the rod member is traveling along a second part of its overall axial displacement towards the locking element which takes place during the connecting operations.

Accordingly, such a recess allows the whole tie member (i.e. first and second portions of the body and the rod member) to be axially displaced towards the second structural part once the first portion of the tie member has been expanded in a substantially radial direction by the expander region of the rod member.

In a second preferred variant of the invention, this stop means may comprise the aforementioned abutment means outwardly extending from the body of the tie member between the first and second portions thereof for limiting axial insertion of the first, expandable, portion of the body of the tie member into the recess formed in the first structural part.

In this case, therefore, such abutment means may advantageously exert the double function of temporarily preventing any substantial axial displacement of the body of the tie member during the connecting operations and of limiting axial insertion of the first, expandable, portion of the body of the tie member into the recess formed in the first structural part.

In a preferred embodiment of the invention, the traction portion of the rod member comprises an annular flange radially outwardly extending from the rod member at a predetermined axial distance from said expander region.

According to this preferred embodiment of the invention, the body of the tie member is preferably provided with an annular recess for slidably housing the traction portion of the rod member.

In such a case, the abutment means cooperating with the traction portion of the rod member comprises an annular shoulder, defined at an end portion of said recess, which is distal with respect to and axially spaced from the engaging zone of the first, expandable, portion of the body of the tie member.

Thanks to this combination of features, the device of the invention advantageously allows to carry out in the most effective manner the expansion of the first, expandable, portion of the body of the tie member by means of the expander region of the rod member and then to carry out the axial displacement of said portion in its expanded condition and of the first structural part in frictional engagement therewith by means of a traction portion, i.e. the annular flange, which is longitudinally spaced apart from the expander region.

In this way, the device of the invention also effectively achieves the above-described pre-compression condition of the tie member which is capable to ensure the maximum traction action between the two furniture parts in abutting relationship with one another.

In an alternative embodiment of the invention, the traction portion of the rod member may comprise a plurality of radial protrusions outwardly extending from the rod member and being circumferentially angularly spaced from one another.

Also in this case the radial protrusions are positioned at a predetermined axial distance from said expander region of the rod member, so as to achieve the aforementioned advantageous technical effects.

Within the framework of this preferred embodiment, the radial protrusions are circumferentially spaced from one another at an angle of about 180° so as to ensure an effective traction action by the rod member on the body of the tie member.

Within the framework of this preferred embodiment, furthermore, the body of the tie member is provided with a plurality of lateral openings for slidably housing the radial protrusions of the rod member.

In such a case, the abutment means cooperating with the traction portion of the rod member comprises an end portion of said lateral openings which is distal with respect to and axially spaced from the engaging zone of the first, expandable, portion of the body of the tie member, so as to ensure an effective traction action by the rod member on the body of the tie member.

In a preferred embodiment of the invention, the second portion of the body of the tie member comprises a first section proximal to the first, expandable, portion of the body of the tie member and a second section distal with respect to said first, expandable, portion, which sections are separated by a pliable region partially axially collapsible.

In this case, the traction action exerted by the rod member causes an axial displacement of the first, expandable, portion and of the aforementioned first section of the second portion of the body of the tie member proximal thereto, ensuring in any case the desired high traction action on the furniture parts in abutting relationship.

This embodiment is particularly advantageous when it is desired to avoid an axial displacement of the tie member as a whole towards the locking element, since in this case the second section of the body of the tie member distal with respect to the first, expandable, portion but proximal to the locking element remains substantially in the same position of non-interference with the latter.

In this way and as will be more clearly apparent in the following, it is also possible to reduce the thickness of the locking element and of the housing intended to receive the same formed in the second furniture part, reduction which may be advantageous or even required for some applications.

Within the framework of this preferred embodiment, the pliable region of the body of the tie member may comprise a portion of said body having a reduced thickness.

In a still further preferred embodiment of the invention, the first, expandable, portion of the body of the tie member has a smaller cross-section with respect to said second portion of the body of the tie member and is connected to said second portion at an annular recess formed at a free end thereof.

In order to enhance the traction performance of the device in some applications, the first, expandable, portion of the body of the tie member may be made of metal and particularly made of spring steel or any other suitable metal alloy possessing good elastic characteristics.

In a still further preferred embodiment of the invention, the traction portion of the rod member comprises the expander region and is preferably coincident with the same.

In this case, it is also preferred that the abutment means intended to cooperate with the traction portion of the rod member comprises a plurality of protrusions formed in the first expandable portion of the body of the tie member and radially inwardly extending in the through passage axially formed in the body of the tie member.

According to a preferred embodiment of the invention, the expander region of the rod member may comprise at least one taper portion, while the engaging zone of the first, expandable, portion of the body of the tie member may have a shape substantially mating the shape of said at least one taper portion.

Advantageously, the provision of one or more taper portion adapted to cooperate in abutting relationship with an engaging zone of substantially mating shape formed in the aforementioned through passage, allows to adjust in the desired manner the expansion performance of the rod member.

In this connection, however, it is to be understood that a mating correspondence between the taper portion(s) and the engaging zone(s) is not a strict requirement and that some differences may be introduced to increase the interference as the expander region of the rod member is axially pulled inwardly of the body of the tie member for providing the desired tightening/expansion characteristics.

Thus, for example, a tapered portion may be present only at the expander region of the rod member or at the corresponding engaging zone of the body without substantially affecting the expansion performance of the device.

Preferably and in order to achieve the desired expansion degree of the first, expandable, portion of the body of the tie member, such an expandable portion may advantageously comprise means adapted to facilitate its expansion.

In a first preferred variant, said means for facilitating expansion comprises at least one slit or, in the alternative, a thinned rupture line, longitudinally extending for at least part of the first, expandable, portion of the body of the tie member.

In a second preferred variant, said means for facilitating expansion comprises an annular cavity, defined in the body of the tie member between its first and second portions, which advantageously acts as a hinge element.

Within the framework of this preferred variant, the annular cavity may optionally house the annular flange acting as an abutment means whenever this flange is present.

In a third preferred variant, said means for facilitating expansion comprises both said at least one longitudinally extending slit or longitudinally extending thinned rupture line and said annular cavity.

According to a preferred embodiment of the invention and in order to enhance the frictional engagement and, possibly, a partial penetration of the first, expandable, portion of the body of the tie member in the recess formed in the first furniture part, said expandable portion is externally provided with suitably shaped gripping means.

Preferably, such gripping means comprises a plurality of suitably shaped ribs or protrusions.

According to a preferred embodiment of the invention and in order to facilitate the pulling action to be exerted on the rod member, the locking element comprises a drum rotatably disposed in said second structural part.

Notably, such a drum may be easily operated by the user by means of conventional tools such as a screwdriver.

Preferably, the drum has at least one camming surface adapted to cooperably engage the engagement surface of said rod member to effect a continuous and gradual axial displacement of the same.

According to a preferred embodiment of the invention, the drum is laterally provided with a recess adapted to house a free end of said second portion of the body of the tie member when said tie member is completely pulled towards said second structural part by said drum.

In this way, the recess laterally formed in the drum allows to achieve an effective axial displacement of the tie member as a whole towards the locking drum when the same is rotated to pull the rod member, thereby ensuring that a maximum traction action is exerted by the device between the two furniture parts in abutting relationship with one another.

Preferably, the drum is disposed within a generally cylindrical housing which advantageously allows a guided turning of the same.

Although the preferred locking element for many application is in the form of a rotatable drum, it will be understood that such a locking element is not limited to a rotatable drum but may in one alternative comprise a linear cam which cooperates with the rod member thanks to a wedging action by adjustable movement in directions intersecting the longitudinal axis of the tie member. It is also envisaged that a rack and pinion type adjuster would be applicable to the connecting device of the invention.

Further Aspects of the Invention

According to a further aspect thereof, the present invention relates to tie member for use in forming a device for detachably connecting two abutting structural parts of the type described above and defined in claim 28 attached herein.

According to a further aspect thereof, the present invention relates to a method as described herein for detachably connecting two abutting structural parts and defined by attached claim 29.

According to an further aspect thereof, the present invention relates to a mounting kit for knock-down furniture parts comprising two disassembled furniture parts and at least one device as described above for detachably connecting said disassembled furniture parts and defined by attached claim 31.

According to a still further aspect thereof, the present invention relates to a mounting kit for knock-down furniture parts comprising two disassembled furniture parts, one of which is fitted with a tie member of the type described above, as defined by attached claim 32.

BRIEF DESCRIPTION OF THE DRAWINGS

Additional features and advantages of the present invention will become more readily apparent from the following detailed description of some preferred embodiments thereof, made with reference to the attached drawings for illustrative and not limiting purposes. In such drawings:

FIGS. 4*a* and 5*a* show enlarged longitudinal cross-sectional views of a first variant of abutment means of a connecting device according to the invention at an initial and, respectively, final stage of the connecting operations;

FIG. 4*b* shows an enlarged view of a second variant of abutment means of a connecting device according to the invention inserted in a flat furniture panel at an initial stage of the connecting operations;

FIG. 5*b* shows an enlarged transversal cross-section of the connecting device of FIG. 4*b* taken along line Vb-Vb of FIG. 4*b*;

FIG. 6 shows a longitudinal partial cross-section of an alternative embodiment of a connecting device according to the invention and of two structural parts in the form of flat furniture panels, at an initial stage of the connecting operations;

FIG. 7 shows a longitudinal partial cross-section of the device of FIG. 6 and of the flat furniture panels at a final stage of the connecting operations;

FIG. 12 shows a longitudinal partial cross-section of another alternative embodiment of a connecting device according to the invention and of two structural parts in the form of flat furniture panels, at an initial stage of the connecting operations;

FIG. 13 shows a longitudinal partial cross-section of the device of FIG. 12 and of the flat furniture panels at a final stage of the connecting operations;

DETAILED DESCRIPTION OF THE PREFERRED EMBODIMENTS

Figure 1:
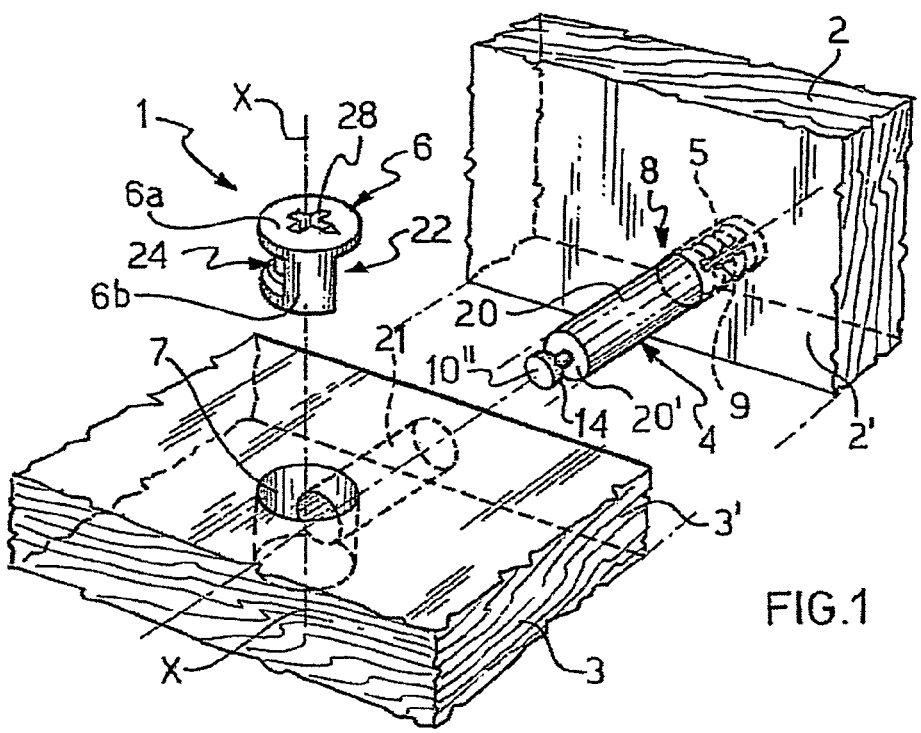
FIG. 1 shows, in a perspective exploded view, two structural parts in the form of flat furniture panels, together with a first embodiment of a connecting device according to the invention.

With reference to FIGS. 1-3, 4a and 5a, a first embodiment of a connecting device according to the invention is generally indicated at 1.

The connecting device 1 allows to detachably connect two abutting structural parts 2, 3 for example two flat furniture panels which, for the sake of simplicity, have in each case only been shown in part.

As is customary in this field, the panels 2, 3 are to be connected together in such a manner that they extend at a right angle to each other and the panel 2 has its front surface 2' resting against the side surface 3' of the panel 3.

In this connection, however, it is to be understood that the connecting device 1 of the invention also allows to detachably connect two abutting structural parts inclined at an angle different from 90° provided that the cooperating parts of the device 1 and of the bores formed in the panels 2, 3 and designed to house the same, which will be illustrated in the following, are suitably oriented with one another.

The device 1 comprises a tie member 4 adapted to be at least partially inserted in a recess 5, for example a cylindrical blind hole, formed in the panel 2 and a locking element 6, for example a drum, rotatably disposed in a corresponding mating cylindrical housing 7 formed in the panel 3.

The tie member 4 comprises in turn a body 8, preferably made of a suitable deformable plastics material, such as polyamide, having a certain degree of elasticity coupled with a good mechanical resistance.

The body 8 is provided with a first, expandable, portion 9 adapted to frictionally engage the blind hole 5 and a rod member 10 slidably arranged in a through passage 11 defined within the body 8 of the tie member 4 for axial displacement of the rod member 10.

In this first embodiment of the invention, the body 8 of the tie member 4 comprises a substantially cylindrical second portion 20 having a length substantially equal to the length of a bore hole 21 formed in the panel 3 and having an axis substantially perpendicular to the axis of the housing 7 designed to house the locking drum 6. Accordingly, the second portion 20 is adapted to be substantially completely inserted in the bore hole 21.

Preferably, the first and second portions 9, 20 of the body 8 of the tie member 4 are integral with one another.

Figure 2:
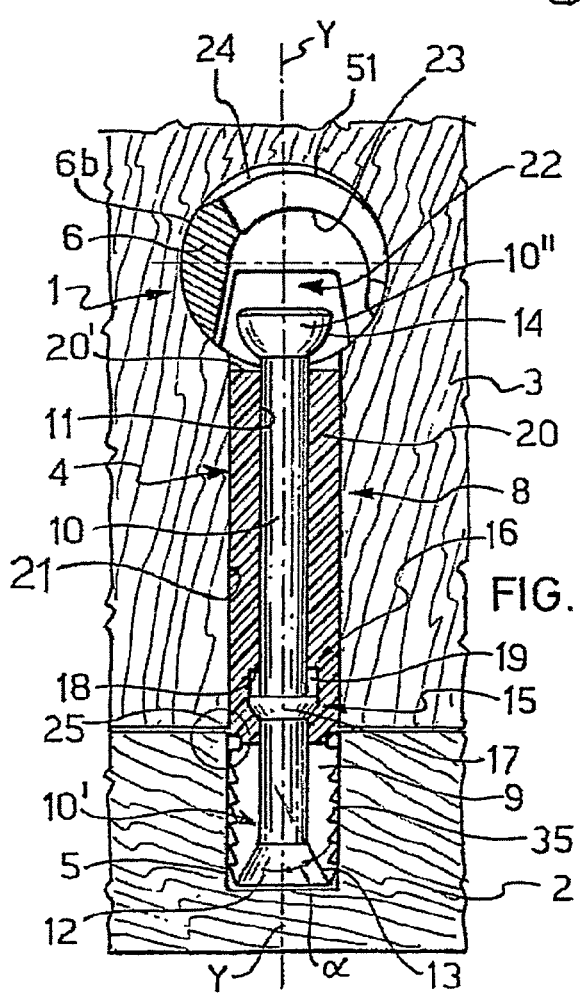
FIG. 2 shows a longitudinal partial cross-section of the device of FIG. 1 and of the flat furniture panels at an initial stage of the connecting operations.
Figure 3:
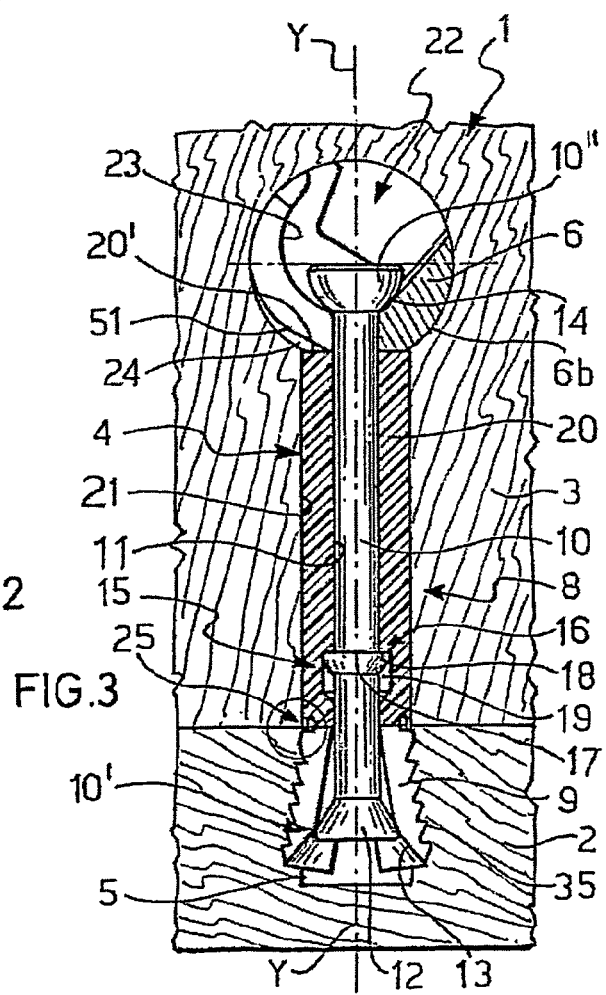
FIG. 3 shows a longitudinal partial cross-section of the device of FIG. 1 and of the flat furniture panels at a final stage of the connecting operations.

In this first embodiment of the invention, the rod member 10 comprises:
i) a first end portion 10' provided with an expander region 12 operable to expand the expandable portion 9 of the body 8 by cooperating with a corresponding engaging zone 13 thereof upon axial displacement of the rod member 10 relative to the body 8 of the tie member 4, and
ii) a second thickened end portion 10" defining an engagement surface 14 adapted to cooperate with a couple of suitably shaped conventional camming surfaces indicated at 23 and one of which is visible in FIGS. 2 and 3, formed within the locking drum 6.

In a way conventional per se and as will be more clearly apparent in the following, the camming surfaces 23 formed within the locking drum 6 cooperate with the engagement surface 14 of the rod member 10 to axially pull the latter towards the axis of rotation X-X of the locking drum 6, i.e. towards the panel 3.

In this first embodiment of the invention, furthermore, the locking drum 6 is laterally provided with:
i) a side surface 6b defining a stop means adapted to cooperate in abutting relationship with a free end 20' of the second portion 20 of the body 8 of the tie member 4 proximal to the thickened end 10" of the rod member 10, so as to temporarily prevent any substantial axial displacement of the body 8 during the initial stage of the connecting operations and to allow a relative movement of the rod member 10 with respect to the body 8,
ii) a gap 22 which allows the insertion therein of the second thickened end portion 10" of the rod member 10, for permitting the subsequent cooperational engagement of the surface 14 with the camming surfaces 23, and with
iii) a recess 24 adapted to house the free end 20' of the second portion 20 of the body 8 of the tie member 4 when the tie member 4 is completely pulled towards said panel 3 by the locking drum 6.

Preferably, the recess 24 has a depth which increases in the circumferential direction of the locking drum 6 so as to define a camming surface 51 adapted to cooperably engage the free end 20' of the second portion 20 of the body 8 during the initial stage of the disconnecting operations.

Preferably, furthermore, the recess 24 has a width in the direction of the axis of rotation X-X of the locking drum 6 which is equal to or greater than the cross section of the free end 20' of the second portion 20 of the body 8.

The locking drum 6 is also laterally provided—in a way conventional per se—with a recess (not shown) which is open laterally and towards the side surface 6b of the locking drum 6 and developed as a narrow slot with undercuts at the inner edge of the slot, the width of the slot corresponding approximately to the cross section of the rod member 10 between the ends 10' and 10" thereof or being slightly greater than said cross section but smaller than the cross section of the end 10".

Conveniently, said undercuts form the aforementioned camming surfaces 23 extending parallel to each other, which have a distance from the axis of rotation X-X of the locking drum 6 which changes in the circumferential direction of the drum and behind which the thickened end 10" of the rod member 10 engages in order to connect the panels 2 and 3 together (see FIGS. 2 and 3).

In a way conventional per se, the locking drum 6 is also provided with a cross-shaped notch 28 on its outer face 6a which, in use, lies flush with the surface of the flat panel 3. The notch 28 allows the insertion of the tip of a suitable tool, such as a screwdriver, for rotating the locking drum 6 about its axis of rotation X-X and pulling the rod member 10 towards said axis.

In accordance with the invention, the rod member 10 is provided with a traction portion 15 radially outwardly extending therefrom and adapted to cooperate with abutment means 16 radially formed in the body 8 of the tie member 4 and defined within the through passage 11 at a predetermined axial distance from the engaging zone 13 of the expandable portion 9 of the body 8.

As will be explained in more detail hereinbelow, the traction portion 15 is capable to effect a substantially simultaneous displacement towards said panel 3 of the first, expandable, portion 9 of the body 8 of the tie member 4 once has been expanded by the expander region 12, and of the panel 2 in frictional engagement therewith, when the rod member 10 is axially pulled by the locking drum 6.

In the preferred embodiment illustrated in FIGS. 1-3, the traction portion 15 of the rod member 10 comprises an annular flange 17 radially outwardly extending from the rod member 10 at a predetermined axial distance from the expander region 12, while the abutment means 16 cooperating with the annular flange 17 comprises an annular shoulder 18, defined at an end portion of a recess 19 formed within the body 8 at a predetermined distance from a free end of the second portion 20 proximal to the first, expandable, portion 9 of the body 8.

The annular shoulder 18 is in this way axially spaced from the engaging zone 13 of the expandable portion 9 of the body 8 of the tie member 4.

Advantageously, the annular recess 19 has a radial width adapted to slidably house the annular flange 17 of the rod member 10 guiding its displacement towards the locking drum 6 and an axial length adapted to accommodate a free axial movement of the annular flange 17 before it engages the annular shoulder 18.

Additionally, the length of the second portion 20 of the body 8 and the axial length of the annular recess 19 formed therein are designed in such a way that the annular flange 17 of the rod member 10 engages the annular shoulder 18 after a first predetermined axial displacement of the rod member 10 which substantially corresponds to a rotational displacement of the locking drum 6 adapted to bring the leading end of the recess 24 (i.e. the end which is firstly engaged by the free end 20' of the portion 20) in substantial axial alignment with the peripheral edge of the free end 20' of the portion 20.

In this way, and as will be more clearly apparent in the following, the side surface 6b of the locking drum 6 abuts against the free end 20' of the portion 20 during a first initial axial displacement of the rod member 10 corresponding to an initial rotational displacement of the locking drum 6 preventing any axial displacement of the portion 20 and allowing a relative movement between the rod member 10 and the body 8, while the recess 24 allows a subsequent predetermined axial displacement of the portion 20 by housing the free end 20' thereof during a second final axial displacement of the rod member 10 corresponding to final rotational displacement of the locking drum 6.

In this way and as will be more clearly apparent in the following, the rod member 10 may firstly expand in a substantially radial direction the first, expandable, portion 9 of the body 8 and then axially pull the expanded portion 9 and the panel 2 in frictional engagement therewith while traveling along the longitudinal axis Y-Y of the tie member 4.

In this preferred embodiment of the invention, the body 8 of the tie member 4 comprises an abutment means 25, which has been encircled in FIGS. 2 and 3 for clarity, outwardly extending from the body 8 of the tie member 4 between the first and second portions 9, 20 thereof for limiting axial insertion of the expandable portion 9 into the blind hole 5 formed in the panel 2.

As illustrated more clearly in FIGS. 4a and 5a, which show an enlarged view of the details encircled in FIGS. 2 and 3, the abutment means 25 comprises a radial annular flange 26, outwardly extending from the second portion 20 of the body 8 proximate to the expandable portion 9 thereof, which allows to correctly position the expandable portion 9 in the blind hole 5 formed in the panel 2 in the initial stage of the connecting operations.

Within the framework of this embodiment and as a consequence of the elastic characteristics of the plastics constituting the body 8, the annular flange 26 is substantially pliable and may be deformed so as to assume a configuration which is substantially flush with the outer surface of the body 8 of the tie member 4 once the tie member 4 is axially pulled by the locking drum 6 during the final stage of the connecting operations.

Preferably and in order to further enhance the capability of the pliable annular flange 26 of assuming such a substantially flush configuration, the body 8 of the tie member 4 according to the invention further comprises a recess 27 constituted by an annular cavity which is defined in the body 8 of the tie member 4 between its first and second portions 9, 20.

Most advantageously, the annular cavity 27 is adapted to fully accommodate the pliable annular flange 26 when the tie member 4 is pulled towards the panel 3 by the locking drum 6.

In this preferred embodiment, the pliable annular flange 26 may also exert the additional advantageous function of ensuring some frictional engagement of the second portion 20 of the body 8 of the tie member 4 in the bore hole 21 formed in the panel 3, thereby advantageously enhancing the ability of the device 1 of ensuring a firm abutting connection between the two panels 2, 3 even when the assembled piece of furniture is transported or undergoes vibration.

Preferably and in order to achieve the desired expansion degree, the expandable portion 9 of the body 8 of the tie member 4 is advantageously provided with means adapted to facilitate its expansion, which means in this case comprises a plurality of angularly spaced slits—conventional per se and not shown in the drawings—longitudinally extending for at least part of the expandable portion 9, and the annular cavity 27 which houses the pliable annular flange 26.

Preferably and in order to achieve and adjust the desired expansion degree, furthermore, the expander region 12 of the rod member 10 comprises a taper portion, while the engaging zone 13 of the first, expandable, portion 9 of the body 8 of the tie member 4 has a shape substantially mating the shape of the taper portion as illustrated in FIGS. 2 and 3.

In other alternative embodiments, not shown, the taper portions of the expander region 12 of the rod member 10 and the corresponding mating regions of the engaging zone 13 may be more than one, such as two or three, and may be axially spaced from one another so as to adjust the degree and extent of expansion of the expandable portion 9 of the body 8.

Also, the inclination of the surface of the taper portions of the expander region 12 of the rod member 10 and of the corresponding mating regions of the engaging zone 13 may be suitably selected at an angle $\alpha$ generally preferably comprised between 10° and 50° and, more preferably, between 25° and 35°, with respect to the longitudinal axis Y-Y of the tie member 4, so as to further adjust the degree and extent of expansion of the expandable portion 9 of the body 8.

In this preferred embodiment of the invention and in order to enhance the frictional engagement and, possibly, a partial penetration of the first, expandable, portion 9 of the body 8 of the tie member 4 in the blind hole 5 formed in the panel 2, the expandable portion 9 is externally provided with a plurality of suitably shaped protrusions 35 exerting the function of gripping means.

A preferred method for detachably connecting the flat panels 2 and 3 by means of the device 1 illustrated hereinabove may be carried out as follows.

In a first preliminary step, the method comprises the insertion of the expandable portion 9 of the tie member 4 in the blind hole 5 formed in the panel 2, which insertion is advantageously limited to the correct extent by the radial annular flange 26 as illustrated hereinabove.

In a second preliminary step and once the tie member 4 has been partially inserted in the blind hole 5 formed in the panel 2, the locking drum 6 is inserted into the housing 7 and the second portion 20 of the tie member 4 protruding from the panel 2 is inserted into the bore hole 21 until the thickened end 10" of the rod element 10 enters the locking drum 6 via the gap 22.

At this point the panels 2 and 3 are slightly spaced apart by the radial annular flange 26 and the device 1 is the initial condition illustrated in FIG. 2.

In this initial condition, the free end 20' of the second portion 20 of the body 8 of the tie member abuts against the side surface 6b of the locking drum 6.

It will be understood that the order of insertion of the tie member 4 and of the locking drum 6 into the panels 2 and 3 is not critical. Thus, for example, the tie member 4 may be alternatively inserted into the bore hole 21 first and then fitted in the blind hole 5 with the expandable portion 9 of the body 8 protruding from the side surface 3' of the panel 3, once the locking drum 6 has been installed in the receiving housing 7.

Once this initial condition has been reached and thanks to the structural and functional features of the device and method of the present invention, the panels 2 and 3 are brought and firmly maintained in a true abutting relationship in two subsequent steps.

In a first of such subsequent steps of the connecting method of the invention, the following operations are carried out substantially simultaneously:
  a first axial displacement of the rod member 10 relative to the body 8 of the tie member 4 and towards the panel 3, and
  an expansion in a dowel fashion and in a substantially radial direction of the first, expandable, portion 9 of the body 8 of the tie member 4 by means of the expander region 12 of the rod member 10 cooperating with the corresponding engaging zone 13 of the first, expandable, portion 9 of the body 8, so as to achieve a frictional engagement between the portion 9 and the blind hole 5 formed in the panel 2.

In this embodiment of the invention, these substantially simultaneous operations take place during an initial part of the overall rotation of the locking drum 6 and of the overall axial displacement of the rod member 10, both obtained by rotating the locking drum 6 about its axis of rotation X-X (i.e. in a clockwise direction as seen in FIGS. 2 and 3) by means of a suitable tool, such as a screwdriver, so as to axially pull the rod member 10 towards said rotation axis by means of the camming surfaces 23 cooperating with the engagement surface 14 of the thickened end 10".

In this step of the connecting method of the invention, the axial displacement of the rod member 10 relative to the body 8 of the tie member 4 is advantageously ensured by the stop means constituted in this case by the side surface 6b of the locking drum 6 which abuts against the free end 20' of the second portion 20 of the body 8 and prevents any axial displacement of the same.

Advantageously, the aforementioned substantially radial expansion of the expandable portion 9 of the tie member 4—which has been amplified for the sake of illustration in FIG. 3—is facilitated both by the longitudinal slits partially axially extending along the expandable portion 9 and by the annular cavity 27 which houses the pliable annular flange 26.

In a second of such subsequent steps of the connecting method of the invention, a substantially simultaneous axial displacement towards the panel 3 of the rod member 10, of the first—now expanded—portion 9 of the body 8 of the tie member 4 and of the panel 2 in frictional engagement therewith, is carried out thanks to the cooperation between the annular flange 17 (traction portion) of the rod member 10 and the annular shoulder 18 (abutment means) formed in the body 8 of the tie member 4 at an axially spaced position with respect to the engaging zone 13 of the expandable portion 9.

In this embodiment of the invention, this substantially simultaneous axial displacement takes place during a second and final part of the overall rotation of the locking drum 6 and of the overall axial displacement of the rod member 10.

As said above, this substantially simultaneous axial displacement is achieved thanks to the fact that the length of the second portion 20 of the body 8 and the axial length of the annular recess 19 formed therein are designed such that the annular flange 17 of the rod member 10 engages the annular shoulder 18 after a predetermined axial displacement of the rod member 10 which corresponds to a rotational displacement of the locking drum 6 adapted to bring the leading end of the recess 24 in substantial axial alignment with the peripheral edge of the free end 20' of the portion 20.

In this step of the connecting method of the invention and thanks to the structural features of the body 8 and of the locking drum 6, therefore, the axial displacement of the rod member 10 along the longitudinal axis Y-Y of the tie member 4 entails an axial displacement of substantially the whole tie member 4 towards the locking drum 6, which is advantageously capable to accommodate in the recess 24 formed in its outer periphery the free end 20' of the second portion 20 of the body 8 proximal to the thickened end 10" of the rod element 10 (see FIG. 3).

During this axial displacement of the tie member 4 towards the locking drum 6 and as best shown in FIGS. 4a and 5a, furthermore, the pliable annular flange 26 is bent in a direction opposite to the direction of pulling and is housed in the annular cavity 27 in a substantially complete manner ensuring that no gaps whatsoever may be formed between the panels 2 and 3 once the connecting operations have been completed.

As may be inferred from the above, the connecting device 1 allows to simultaneously achieve the desired easy, quick and firm connection between the panels 2, 3 to be assembled with one another.

The connecting device 1 also allows to maintain this firm connection between the panels 2, 3 even if the latter are transported or subjected to vibrations thanks to the "preload" imparted to the tie member 4 during the connecting operations and which advantageously substantially prevents any subsequent relative movement between the panels 2, 3.

The same quick and easy operations are required to loosen the two panels 2 and 3 which may be effected by turning the locking drum 6 in the opposite direction (i.e. in the counterclockwise direction as seen in FIGS. 2 and 3).

Advantageously, the disconnecting operations of the two abutting panels 2, 3 are facilitated both by the camming surface 51 defined within the recess 24, which camming surface 51 cooperates with the free end 20' of the second portion 20 of the body 8 and helps to separate the panels 2, 3 from one another, and by the fact that the pre-compressed portion 9 of the body 8 partially releases the elastic energy stored therein during the final step of the connecting operations, once the engagement surface 14 of the thickened end 10" of the rod 10 is released by the camming surfaces 23.

Additional embodiments of the connecting device 1 and of the tie member 4 of the present invention are shown in FIGS. 4b, 5b and 8-16.

For the sake of brevity, in these figures elements which are structurally or functionally equivalent to those previously illustrated with reference to FIGS. 1-3 and 4a-5a, will be indicated with the same reference numbers and will not be further described.

In an first alternative embodiment of the device 1, shown in FIGS. 4b and 5b, the abutment means 25 for limiting axial insertion of the expandable portion 9 into the blind hole 5 comprises a plurality of longitudinal ribs 29 outwardly extending from the second portion 20 of the body 8 of the tie member 4 at a free end thereof proximal to the expandable portion 9.

Preferably, the longitudinal ribs 29 are integral with the second portion 20 of the body 8 and are pliable due to the elastic nature of the plastics material which constitutes the body 8.

In the embodiment shown in FIGS. 4b and 5b, the longitudinal ribs 29 taper to a point at their end distal from the expandable portion 9 of the body 8 of the tie member 4 and preferably have a substantially triangular shape.

In this preferred embodiment, the longitudinal ribs 29 exert not only the function of abutment means capable of limiting axial insertion of the expandable portion 9 of the tie member 4 into the blind hole 5 formed in the panel 2, but also the additional advantageous function of ensuring a frictional engagement of the second portion 20 of the body 8 of the tie member 4 in the bore hole 21 formed in the panel 3. The frictional engagement between the ribs 29 and the bore hole 21 formed in the panel 3 may also involve a partial compression of the material constituting the ribs 29 and/or a partial penetration of the same into the panel 3 depending upon the relative hardness of the materials constituting these engaging parts.

In this way, the longitudinal ribs 29 advantageously allow to enhance the ability of the device 1 of ensuring a firm abutting connection between the two panels 2, 3 even when the assembled piece of furniture is transported or undergoes vibration.

In this embodiment, the body 8 of the tie member 4 comprises a plurality of recesses 30 laterally formed aside each longitudinal rib 29 in the outer surface of the second portion 20 of the body 8.

Preferably, the recesses 30 have a shape substantially mating the shape of the longitudinal ribs 29 and are advantageously capable to house the pliable longitudinal ribs 29 once the same are laterally bent along a circumferential direction—as shown by the arrows F in FIG. 5b—as a consequence of the pulling action exerted by the locking drum 6 acting in operation on the rod member 10.

In this case, the pliable longitudinal ribs 29 may be housed in the mating recesses 30 in a more or less complete manner so as to adjust in the desired way the frictional engagement between the longitudinal ribs 29 and the bore hole 21 and ensure at the same time that no gaps are formed between the panels 2, 3 once the connecting operations have been completed.

In this embodiment, furthermore, the means facilitating the expansion of the expandable portion 9 of the body 8 of the tie member 4 comprises an annular cavity 31—defined between the first and second portions 9, 20 of the body as well as longitudinal slits axially partially formed in the expandable portion 9.

Clearly, the cavity 31 does not house in this case any pliable portion of the body 8.

In an second alternative embodiment of the device 1, shown in FIGS. 6 and 7, the second portion 20 of the body 8 of the tie member 4 comprises a first section 20a proximal to the first, expandable, portion 9 of the body 8 of the tie member 4 and a second section 20b distal with respect to said first, expandable, portion 9.

In this embodiment, the sections 20a and 20b of the portion 20 are separated by a pliable region 20c partially axially collapsible and comprising a portion of the body 8 having a reduced thickness.

In this case, the detachable connection of the panels 2 and 3 is effected in just the same way as the previous embodiments, save for the fact that the traction action exerted by the rod member 10 once the annular flange 17 has engaged the annular shoulder 18 causes an axial displacement only of the first, expanded, portion 9 and of the first section 20a of the second portion 20 of the body 8 of the tie member 4 proximal to the portion 9.

This embodiment ensures that the desired high traction action on the panels 2 and 3 is achieved when it is desired at the same time to avoid an axial displacement of the tie member 4 as a whole towards the locking drum 6, since the second section 20b of the portion 20 of the body 8 of the tie member 4 proximal to the locking drum 6 remains substantially in the same position of non-interference with the latter thanks to the abutting cooperation between the side surface 6b of the drum 6 (stop means) and the free end 20' of the second section 20b.

In this case, therefore, the recess 24 in the locking drum 6 is no longer required with an advantageous reduction in the production costs.

In the absence of the recess 24, furthermore, the locking drum 6 has a side surface 6b provided with a longer circumferential portion adapted to cooperate with the side surface of the housing 7 with respect to the previous embodiment, which portion essentially extends in this case for the whole circumference of the drum 6 except for the gap 22. In view of this feature, this embodiment also allows to reduce the thickness of the locking drum 6 and the depth of the housing 7 formed in the panel 3, a reduction which may be advantageous or even required for some applications.

A number of experimental tests carried out by the Applicant, proved that this embodiment is capable to achieve the same advantageous technical effects of an easy, quick and firm connection between the panels 2, 3 to be assembled with one another reached by the embodiment described hereinabove with reference to FIGS. 1-3.

Figure 8:
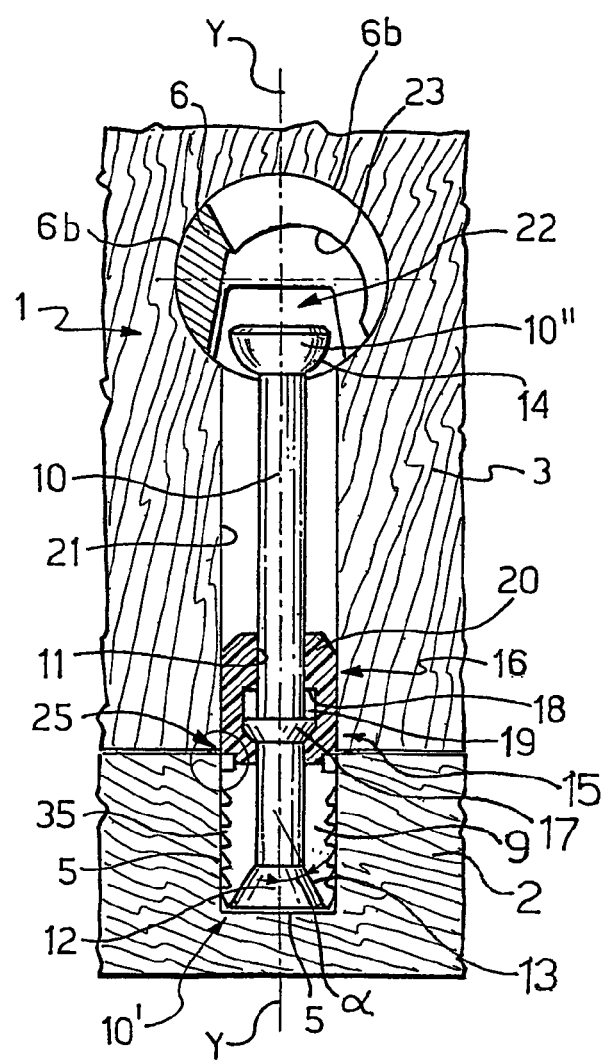
FIG. 8 shows a longitudinal partial cross-section of another alternative embodiment of a connecting device according to the invention and of two structural parts in the form of flat furniture panels, at an initial stage of the connecting operations.
Figure 9:
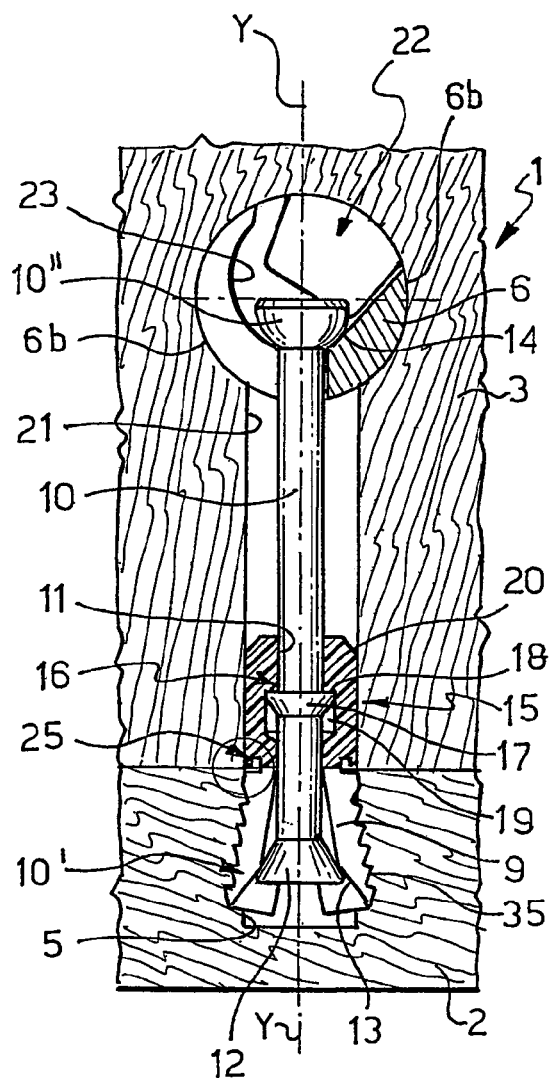
FIG. 9 shows a longitudinal partial cross-section of the device of FIG. 8 and of the flat furniture panels at a final stage of the connecting operations.

In a third alternative embodiment of the device 1, shown in FIGS. 8 and 9, the second portion 20 of the body 8 of the tie member 4 has a limited axial length and is housed in the bore hole 21 formed in the panel 3 only for an initial portion thereof.

In this case and in view of the limited axial length of the second portion 20 of the body 8, the radial annular flange 26 exerts the double function of limiting the axial insertion of the first, expandable, portion 9 of the body 8 of the tie member 4 into the blind hole 5 formed in the panel 2 and of temporarily preventing any substantial axial displacement of the body 8 of the tie member 4 during the initial axial displacement of the rod member 10 towards the locking drum 6, thereby allowing a relative movement of the rod member 10 relative to the body 8 and the substantially radial expansion of the portion 9 thereof.

This alternative embodiment of the device 1 achieves not only the advantages of the previous embodiment illustrated in connection with FIGS. 6 and 7, but also the additional advantages of a lower cost, due to the limited amount of material to be employed to manufacture the body 8, and a higher flexibility of use, due to the fact that a body 8 of a single measure may be employed to manufacture tie members 4 which fit (with a corresponding rod member 10 of suitable length) different lengths of the bore hole 21.

In this alternative embodiment of the device 1 and as said above, the disconnecting operations are advantageously facilitated by the fact that the pre-compressed portion 9 of the body 8 partially releases the elastic energy stored therein during the final step of the connecting operations, once the engagement surface 14 of the thickened end 10" of the rod 10 is released by the camming surfaces 23, thereby facilitating the separation of the abutting panels 2, 3.

Figure 10:
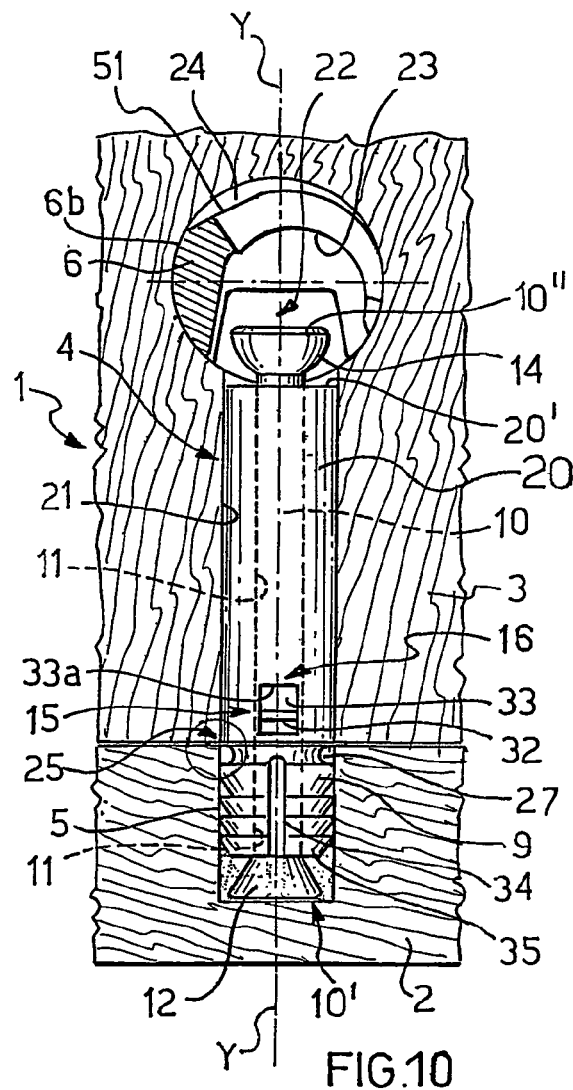
FIG. 10 shows a longitudinal partial cross-section of another alternative embodiment of a connecting device according to the invention and of two structural parts in the form of flat furniture panels, at an initial stage of the connecting operations.
Figure 11:
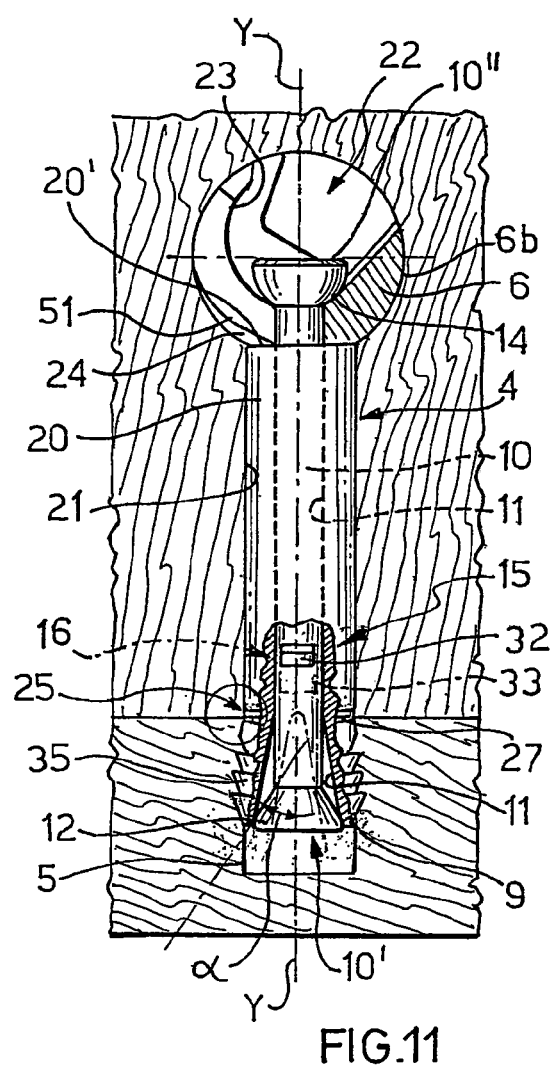
FIG. 11 shows a longitudinal partial cross-section of the device of FIG. 10 and of the flat furniture panels at a final stage of the connecting operations.

In a fourth alternative embodiment of the device 1, shown in FIGS. 10 and 11, the traction portion 15 of the rod member 10 comprises a plurality of radial protrusions 32 outwardly extending from the rod member 10 and being circumferentially angularly spaced from one another.

The radial protrusions 32 are positioned at a predetermined axial distance from the expander region 12 of the rod member 10, while the body 8 of the tie member 4 is provided with a plurality of corresponding circumferentially spaced lateral openings 33 for slidably housing the radial protrusions 32 of the rod member 10 formed in the body 8 at a predetermined axial distance from the engaging zone 13.

In this embodiment, the abutment means 16 cooperating with the radial protrusions 32 (traction portion 15) of the rod member 10 comprises an end portion 33a of said lateral openings 33 so as to ensure an effective axial pulling action by the rod member 10 on the body 8 of the tie member 4.

Preferably, the device 1 comprises two radial protrusions 32 and two corresponding lateral openings 33 which are angularly spaced from one another at an angle of about 180°.

In other alternative embodiments, not shown, the radial protrusions 32 and the corresponding lateral openings 33 may be more than two, such as three or four, and are preferably angularly spaced from one another in a regular manner (120°, 90° and so on).

Also in this case, the substantially radial expansion of the expandable portion 9 of the tie member 4 is facilitated both by the longitudinal slits partially axially extending along the expandable portion 9 (one of which, indicated at 34, is visible in FIG. 10) and by the annular cavity 27 which houses the pliable annular flange 26.

A number of experimental tests carried out by the Applicant, proved that this embodiment is capable to achieve the same advantageous technical effects of an easy, quick and firm connection between the panels 2, 3 to be assembled with one another reached by the embodiment described hereinabove with reference to FIGS. 1-3 and 4a-5a.

Notably, these advantageous technical effects have been achieved despite the fact that the engaging zone 13 of the first, expandable, portion 9 of the body 8 of the tie member 4 does not possess a region having a shape mating the shape of the taper portion of the expander region 12.

In a fifth alternative embodiment of the device 1, shown in FIGS. 12 and 13, which advantageously allows to enhance the traction performance of the device in some applications, the first, expandable, portion 9 of the body 8 of the tie member 4 is made of metal and has a smaller cross-section with respect to the second portion 20 of the body 8.

Preferably, the first, expandable, portion 9 of the body 8 is made of spring steel and is connected to the second portion 20 of the body 8 of the tie member 4 at an annular recess 36 formed at a free end of the second portion 20.

In this embodiment, the traction portion 15 of the rod member 10 comprises the expander region 12, while the abutment means 16 intended to cooperate with the traction portion 15/expander region 12 of the rod member 10 comprises a plurality of protrusions 37 preferably formed by drawing in the first expandable portion 9 of the body 8 of the tie member 4 at a predetermined axial distance from the engaging zone 13.

The protrusions 37 are preferably angularly spaced at regular intervals and are radially inwardly extending in the through passage 11 axially formed in the body 8 of the tie member 4 for allowing their abutting cooperation with the traction portion 15/expander region 12.

In this embodiment, the device 1 may comprise either two radial protrusions 37 angularly spaced from one another at an angle of about 180° or more than two protrusions 37, such as for example three or four, preferably angularly spaced from one another in a regular manner (120°, 90° and so on).

Also in this case, the substantially radial expansion of the expandable portion 9 of the tie member 4 is facilitated by longitudinal slits (not shown) partially axially extending along the expandable portion 9.

As may be seen in FIGS. 12 and 13, the abutment means 25 comprises in this case an annular shoulder 38 defined at the free end of the second portion 20 of said body 8 proximal to the first, expandable, portion 9.

Figure 14:
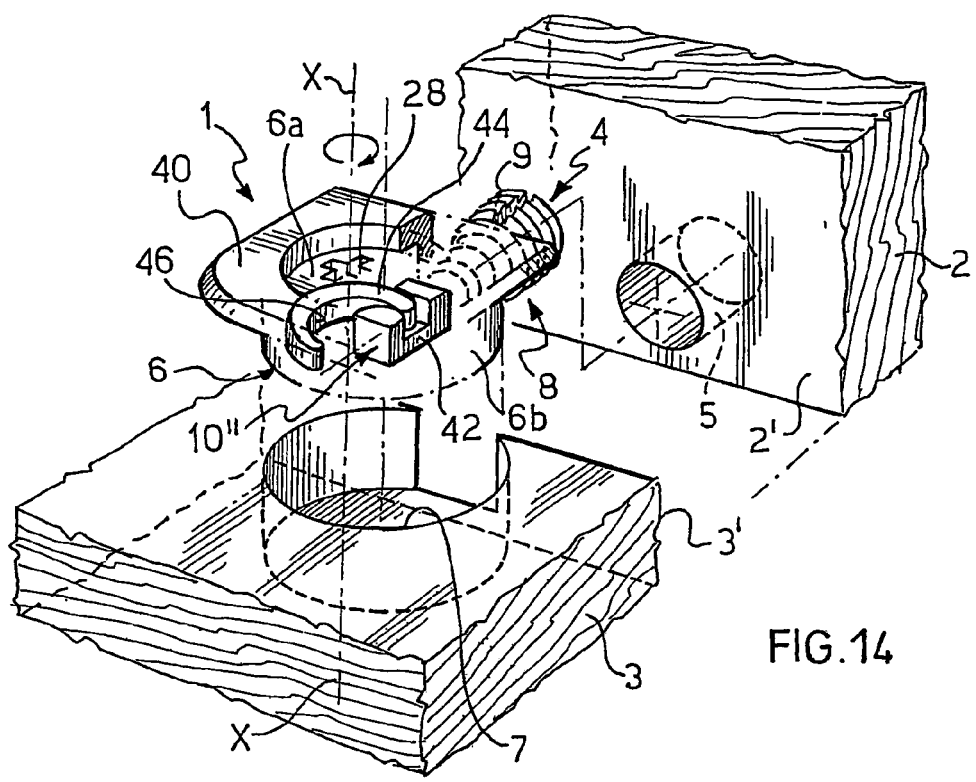
FIG. 14 shows, in a perspective exploded view, two structural parts in the form of flat furniture panels, together with another alternative embodiment of a connecting device according to the invention.
Figures 15, 16:
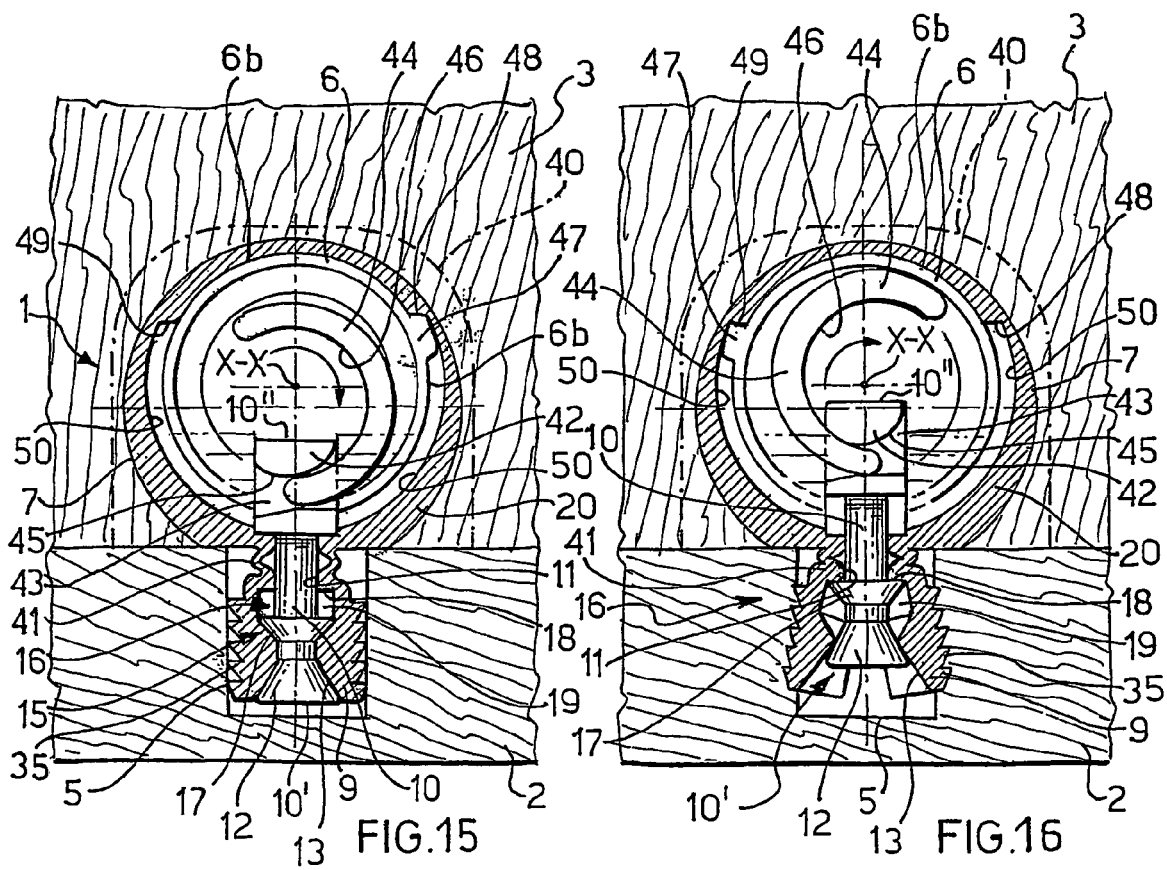
FIG. 15 shows a longitudinal partial cross-section of the device of FIG. 14 and of the two flat furniture panels at an initial stage of the connecting operations.
FIG. 16 shows a longitudinal partial cross-section of the device of FIG. 14 and of the two flat furniture panels at a final stage of the connecting operations.

In a sixth alternative embodiment of the invention, shown in FIGS. 14-16, the device 1 comprises a tie member 4 having a body 8 including a first expandable portion 9 adapted to be inserted in the recess 5 formed in the panel 2 and a second, substantially disc-shaped, cylindrical portion 20, adapted to be inserted in a corresponding mating housing 7 formed in the panel 3.

In this embodiment, the side surface 3' of the panel 3 is substantially secant with respect to the housing 7, so that the bore hole 21 is no longer required.

In this embodiment, the second, substantially disc-shaped portion 20 is provided with a through opening 50 adapted to house in a rotatable manner the locking drum 6 and surrounded by a flange 40 resting on the flat top surface of the panel 3.

Also in this case, the body 8 is preferably made of plastics such as, for example, polyamide, while the first, expandable, portion 9 adapted to frictionally engage the blind hole 5 and the second, substantially disc-shaped portion 20 inserted in the housing 7 and adapted to house in a rotatable manner the locking drum 6 are integral with one another.

In order to allow the axial displacement of the first, expandable, portion 9 once the same has been expanded in a substantially radial direction by the cooperation between the annular flange 17 and the annular shoulder 18, the body 8 is provided between the portions 9 and 20 with an intermediate pliable region 41 having a reduced thickness partially axially collapsible.

In this embodiment, the thickened end portion 10" of the rod member 10 which cooperates with the locking drum 6 is provided with a suitably shaped recess 43 adapted to cooperably engage a crescent-shaped rib 44 extending from the body of the locking drum 6 at an eccentric position with respect to the axis of rotation X-X of the drum.

In this way, the radially inner wall 45 of the recess 43 constitutes an engagement surface of the rod member 10, while the radially inner wall 46 of the rib 44 constitutes a cooperating camming surface of the locking drum 6 which is adapted to axially pull the rod member 10 towards the panel 3 when the locking drum 6 is rotated about its rotation axis X-X.

In this embodiment and in order to ensure a proper angular displacement of the locking drum 6, the device 1 is advantageously provided with stop means for limiting the rotational movement of the locking drum 6.

Preferably, the stop means comprises a projection 47 radially outwardly extending from the side surface 6b of the locking drum 6 and a couple of shoulders 48, 49 formed at angularly offset positions in the inner wall 50 of the opening 50 formed in the second disc-shaped portion 20 of the body 8 as better shown in FIGS. 15 and 16.

A number of experimental tests carried out by the Applicant, proved that also this embodiment is capable to achieve the same advantageous technical effects of an easy, quick and firm connection between the panels 2, 3 to be assembled with one another reached by the embodiments described hereinabove.

It will be understood that whilst the embodiments have been described in relation to the connection of a surface side of one structural part and a front surface of another structural part, the device is equally suited to forming a side to side surface joints. Furthermore, the device is not limited merely to use with furniture parts and may be used for forming a joint between a first structural part in the form, for example, of a panel and a wall or other structural supporting element whereby an object comprising the first structural part would be fixed to the wall or other structural supporting element.

The invention has been described above on basis of some illustrative embodiments. It is to be understood that numerous modifications in and changes hereof are possible without thereby going beyond the inventive concept.

The invention claimed is:

1. A device for detachably connecting two abutting structural parts, comprising:
   a tie member adapted to be at least partially inserted in a recess formed in a first of said structural parts, said tie member comprising:
      a body provided with a first, expandable, portion adapted to frictionally engage said recess, and
      a rod member slidably arranged in a through passage defined within the body of the tie member for axial displacement therein, said rod member comprising:
         a first end portion provided with an expander region operable to expand said first, expandable, portion of the body by cooperating with a corresponding engaging zone thereof upon displacement of the rod member relative to the body of the tie member, and
         a second end portion defining an engagement surface;
   a locking element operable to be disposed in a second of said structural parts and to cooperate with the engagement surface of said rod member to pull said rod member towards said second structural part,
   wherein said rod member is provided with a traction portion outwardly extending therefrom and adapted to cooperate with abutment means formed at the through passage defined within the body of the tie member at a predetermined axial distance from said engaging zone of the first, expandable, portion of said body;
   wherein said traction portion is spaced from said abutment means during a first part of the axial displacement of the rod member in which the expander region of the rod member expands said first, expandable, portion of the body; and
   wherein said traction portion is operatively engaged with said abutment means during a second part of the axial displacement of the rod member as to effect a substantially simultaneous displacement towards said second structural part of said first, expandable, portion of the body of the tie member and of the first structural part in frictional engagement therewith.

2. A device according to claim 1, wherein the body of the tie member comprises a second portion adapted to be at least partially inserted in a bore hole formed in said second structural part.

3. A device according to claim 2, wherein said first and second portions of the body of the tie member are integral with one another.

4. A device according to claim 2, wherein the body of the tie member comprises an abutment means outwardly extending from the body of the tie member between said first and second portions thereof for limiting axial insertion of said first, expandable, portion into said recess formed in the first structural part.

5. A device according to claim 4, wherein said abutment means is substantially pliable.

6. A device according to claim 5, further comprising at least one recess for housing said pliable abutment means when said tie member is completely or partly pulled towards said second structural part by said locking element.

7. A device according to claim 4, wherein said abutment means is selected from the group comprising a radial annular flange outwardly extending from the body of the tie member proximate to said first, expandable, portion, a plurality of circumferentially spaced radial protrusions or longitudinal ribs outwardly extending from the second portion of the body of the tie member at a free end thereof proximal to said first, expandable, portion, or an annular shoulder defined at said free end of the second portion of said body proximal to said first, expandable, portion.

8. A device according to claim 2, wherein said first, expandable, portion of the body of the tie member has a smaller cross-section with respect to said second portion of the body of the tie member and is connected to said second portion at an annular recess formed at a free end thereof.

9. A device according to claim 2, wherein said drum is laterally provided with a recess adapted to house a free end of said second portion of the body of the tie member when said tie member is completely pulled towards said second structural part by said drum.

10. A device according to claim 1, further comprising stop means adapted to temporarily allow a relative movement of the rod member with respect to the body of the tie member.

11. A device according to claim 1, wherein said traction portion of the rod member comprises an annular flange radially outwardly extending from the rod member at a predetermined distance from said expander region.

12. A device according to claim 1, wherein the body of the tie member is provided with an annular recess for slidably housing the traction portion of the rod member and wherein said abutment means comprises an annular shoulder defined at an end portion of said recess.

13. A device according to claim 1, wherein said traction portion of the rod member comprises a plurality of radial protrusions outwardly extending from the rod member and being angularly spaced from one another, said radial protrusions being positioned at a predetermined distance from said expander region.

14. A device according to claim 13, wherein said radial protrusions are angularly spaced from one another at an angle of about 180°.

15. A device according to claim 13, wherein the body of the tie member is provided with a plurality of lateral openings for slidably housing the radial protrusions of the rod member and wherein said abutment means comprises an end portion of said lateral openings.

16. A device according to claim 1, wherein said second portion of the body of the tie member comprises a first section proximal to said first, expandable, portion of the body of the tie member and a second section distal with respect to said expandable portion, said sections being separated by a pliable region partially axially collapsible.

17. A device according to claim 16, wherein said pliable region comprises a portion of said body having a reduced thickness.

18. A device according to claim 1, wherein said traction portion of the rod member comprises said expander region.

19. A device according to claim 1, wherein said abutment means comprises a plurality of protrusions formed in said first expandable portion of the body of the tie member and radially inwardly extending in said through passage.

20. A device according to claim 1, wherein said expander region of the rod member comprises at least one taper portion and wherein said engaging zone of the first, expandable, portion of the body of the tie member has a shape substantially mating the shape of said at least one taper portion.

21. A device according to claim 1, wherein said first, expandable, portion of the body of the tie member comprises means facilitating expansion thereof.

22. A device according to claim 21, wherein said means for facilitating expansion comprises at least one longitudinally extending slit and/or a longitudinally extending thinned rupture line and/or an annular cavity defined in said body of the tie member between said first and second portions thereof.

23. A device according to claim 1, wherein said first, expandable, portion of the body of the tie member is externally provided with gripping means for enhancing frictional engagement with said recess of the first structural part.

24. A device according to claim 23, wherein said gripping means comprises a plurality of ribs or protrusions.

25. A device according to claim 1, wherein said locking element comprises a drum rotatably disposed in said second structural part.

26. A device according to claim 25, wherein said drum has at least one camming surface adapted to cooperably engage the engagement surface of said rod member.

27. A device according to claim 25, wherein said drum is disposed within a generally cylindrical housing.

28. A mounting kit for knock-down furniture parts comprising two disassembled furniture parts and at least one device according to anyone of claims 1-27 for detachably connecting said disassembled furniture parts.

29. A tie member for use in forming a device for detachably connecting two abutting structural parts, the tie member being adapted to be at least partially inserted in a recess formed in a first of said structural parts and comprising:
  a body provided with a first, expandable, portion adapted to frictionally engage said recess, and
  a rod member slidably arranged in a through passage defined within the body of the tie member for axial displacement therein, said rod member having a first end portion provided with an expander region operable to expand said first, expandable, portion of the body by cooperating with a corresponding engaging zone thereof upon displacement of the rod member relative to the body of the tie member,
  wherein said rod member is provided with a traction portion outwardly extending therefrom and adapted to cooperate with abutment means formed at the through passage defined within the body of the tie member at a predetermined axial distance from said engaging zone of the first, expandable, portion of said body;
  wherein said traction portion is spaced from said abutment means during a first part of the axial displacement of the rod member in which the expander region of the rod member expands said first, expandable, portion of the body; and
  wherein said traction portion is operatively engaged with said abutment means during a second part of the axial displacement of the rod member so as to effect a substantially simultaneous displacement towards said second structural part of said first, expandable, portion of the body of the tie member and of the first structural part in frictional engagement therewith.

30. A mounting kit for knock-down furniture parts comprising two disassembled furniture parts, one of which is fitted with a tie member according to claim 29.

31. A tie member according to claim 29, wherein the body of the tie member comprises a second portion adapted to be at least partially inserted in a bore hole formed in said second structural part.

32. A tie member according to claim 31, wherein said first and second portions of the body of the tie member are integral with one another.

33. A tie member according to claim 31, wherein the body of the tie member comprises an abutment means outwardly extending from the body of the tie member between said first and second portions thereof for limiting axial insertion of said first, expandable, portion into said recess formed in the first structural part.

34. A tie member according to claim 33, wherein said abutment means is substantially pliable.

35. A tie member according to claim 33, wherein said abutment means is selected from the group comprising a radial annular flange outwardly extending from the body of the tie member proximate to said first, expandable, portion, a plurality of circumferentially spaced radial protrusions or longitudinal ribs outwardly extending from the second portion of the body of the tie member at a free end thereof proximal to said first, expandable, portion, or an annular shoulder defined at said free end of the second portion of said body proximal to said first, expandable, portion.

36. A tie member according to claim 31, wherein said first, expandable, portion of the body of the tie member has a smaller cross-section with respect to said second portion of the body of the tie member and is connected to said second portion at an annular recess formed at a free end thereof.

37. A tie member according to claim 31, wherein said drum is laterally provided with a recess adapted to house a free end of said second portion of the body of the tie member when said tie member is completely pulled towards said second structural part by said drum.

38. A tie member according to claim 29, further comprising stop means adapted to temporarily allow a relative movement of the rod member with respect to the body of the tie member.

39. A tie member according to claim 29, wherein said traction portion of the rod member comprises an annular flange radially outwardly extending from the rod member at a predetermined distance from said expander region.

40. A tie member according to claim 29, wherein the body of the tie member is provided with an annular recess for slidably housing the traction portion of the rod member and wherein said abutment means comprises an annular shoulder defined at an end portion of said recess.

41. A tie member according to claim 29, wherein said traction portion of the rod member comprises a plurality of radial protrusions outwardly extending from the rod member and being angularly spaced from one another, said radial protrusions being positioned at a predetermined distance from said expander region.

42. A tie member according to claim 41, wherein said radial protrusions are angularly spaced from one another at an angle of about 180°.

43. A tie member according to claim 41, wherein the body of the tie member is provided with a plurality of lateral openings for slidably housing the radial protrusions of the rod member and wherein said abutment means comprises an end portion of said lateral openings.

44. A tie member according to claim 29, wherein said second portion of the body of the tie member comprises a first section proximal to said first, expandable, portion of the body of the tie member and a second section distal with respect to said expandable portion, said sections being separated by a pliable region partially axially collapsible.

45. A tie member according to claim 44, wherein said pliable region comprises a portion of said body having a reduced thickness.

46. A tie member according to claim 29, wherein said traction portion of the rod member comprises said expander region.

47. A tie member according to claim 29, wherein said abutment means comprises a plurality of protrusions formed in said first expandable portion of the body of the tie member and radially inwardly extending in said through passage.

48. A tie member according to claim 29, wherein said expander region of the rod member comprises at least one taper portion and wherein said engaging zone of the first, expandable, portion of the body of the tie member has a shape substantially mating the shape of said at least one taper portion.

49. A tie member according to claim 29, wherein said first, expandable, portion of the body of the tie member comprises means facilitating expansion thereof.

50. A tie member according to claim 49, wherein said means for facilitating expansion comprises at least one longitudinally extending slit and/or a longitudinally extending thinned rupture line and/or an annular cavity defined in said body of the tie member between said first and second portions thereof.

51. A tie member according to claim 29, wherein said first, expandable, portion of the body of the tie member is externally provided with gripping means for enhancing frictional engagement with said recess of the first structural part.

52. A tie member according to claim 51, wherein said gripping means comprises a plurality of ribs or protrusions.

53. A method for detachably connecting two abutting structural parts comprising:
  partially inserting in a recess formed in a first of said structural parts a tie member comprising:
    a body provided with a first, expandable, portion adapted to frictionally engage said recess, and
    a rod member slidably arranged in a through passage defined within the body of the tie member for axial displacement therein, said rod member being provided with a traction portion outwardly extending therefrom and adapted to cooperate with abutment means formed at said through passage at a predetermined axial distance from an engaging zone of the first, expandable, portion of said body;
  carrying out substantially simultaneously:
    a first axial displacement of the rod member relative to the body of the tie member and towards a second of said structural parts, and
    an expansion in a substantially radial direction of the first, expandable, portion of the body of the tie member by means of an expander region defined at a first end portion of the rod member cooperating with said engaging zone of the first, expandable, portion of the body;
  subsequently carrying out a substantially simultaneous axial displacement towards said second structural part: of the rod member, of the first expanded portion of the body of the tie member and of the first structural part in frictional engagement therewith,
  wherein the traction portion of the rod member is spaced from said abutment means during said first axial displacement of the rod member, and
  wherein the traction portion of the rod member is operatively engaged with said abutment means during said substantially simultaneous axial displacement of the rod member, of the first expanded portion of the body of the tie member and of the first structural part in frictional engagement therewith.

54. A method according to claim 53, wherein said axial displacements of the rod member towards said second structural part is said carrying out and subsequently carrying out are carried out by means of a locking element operable to be disposed in said second structural part and to cooperate with an engagement surface defined at a second end portion of the rod member to pull the same towards said second structural part.

* * * * *